UNITED STATES PATENT OFFICE.

JOSEF HABERMANN AND RICHARD EHRENFELD, OF BRÜNN, AUSTRIA-HUNGARY.

PROCESS OF OBTAINING LECITHIN, LECITH-ALBUMIN, AND THEIR BY-PRODUCTS OUT OF RAW MATERIAL CONTAINING LECITHIN.

987,133.     Specification of Letters Patent.     Patented Mar. 21, 1911.

No Drawing.     Application filed May 28, 1908. Serial No. 435,419.

*To all whom it may concern:*

Be it known that we, JOSEF HABERMANN and RICHARD EHRENFELD, both subjects of the Emperor of Austria-Hungary, and residents of Brünn, in Mähren, Austria-Hungary, have invented certain new and useful improvements in processes of separating and producing lecithin, lecithin-albumin, and their by-products out of raw materials containing lecithin, of which the following is a specification.

This invention relates to a process of obtaining lecithalbumin, and lecithin therefrom. The raw materials most to be considered are the yolk of eggs in any form, brain and spinal marrow, cod-liver oil and vegetable substances containing lecithin.

The essential feature of the process is that one of the above-named raw materials or mixtures of the same is extracted with an ester of the saturated fatty acids, for instance acetic ether, or mixtures of such esters, in a cold state. The ester, or the ester-mixture used, should, as far as possible, contain no water and be highly volatile. The residue left upon extraction contains a great amount of lecithin, and is a nearly colorless mass, while the fat (yolk-oil) coloring matters or aromatic substances and cholesterin are dissolved by the extraction-fluid. The extraction-fluid is won back by distillation. The residue of the extraction contains besides lecithin especially lecithin-albumin and can, after having been suitably dried, be used in this form as a very valuable lecithin preparation. This lecithin preparation has the advantage of being entirely free from fat and containing absolutely no cholesterin. The amount of lecithin of the extraction residue which may still be combined as lecithin-albumin can be freed and entirely separated from this composition by extraction with the hot ester of a fatty acid (acetic ether) or a suitable mixture of several esters or also in the already known manner by treating it with boiling ethyl-alcohol. The extraction-residue won in the first instance through the treatment with cold ester then is treated with boiling ester (acetic ether). The solution of lecithin so obtained is cooled whereby lecithin, in the form of a yellowish white wax-like mass is separated out of the extract. This lecithin is of such a purity that it requires no further purification.

The special advantage which the winning of lecithin according to the present process offers consists in the fact that one and the same extraction-fluid for the whole process produces, by a cold and then by a hot extraction, a lecithin of great purity in a proportionately very short time. The cold extraction of the raw materials containing lecithin with a fatty acid ester or with a mixture of several esters possesses special advantages over the cold processes, as fats, coloring matters and cholesterin are practically entirely extracted without the lecithin itself being dissolved, while, on the other hand, the cholesterin can be obtained from the extraction solution, as will be described farther on. The lecithin preparation is therefore purer and more valuable and also the value of the by-products is greater than with the extracting processes hitherto in use. The subsequent treatment of the residue of the cold extraction with fatty acid esters with boiling alcohol instead of ester produces likewise a pure lecithin, or a lecithin preparation separated out of the albumin compound.

When using the yolk of eggs as raw material in the present process the yolk-oil extracted with the cold extracting medium contains, as has already been mentioned, all the cholesterin. After distilling off the ester in the vacuum and on cooling the residue, a thick deposit of cholesterin separates out in the fatty oil and this cholesterin is obtained by centrifuging or pressing off the oil. After then removing the last traces of fatty oil by treatment of the deposit of cholesterin with a fatty acid ester in a cold state, this by-product can be obtained in a crystalline form by a crystallizing out of alcohol, benzol or the like. The process according to the present invention produces therefore in its different steps, on the one hand, a very valuable, nearly colorless lecithin preparation, further yolk-oil in a very pure form, pure cholesterin and, in its second part, lecithin of very great purity.

The following description of the mode of carrying out the process is intended to explain the same more fully. 100 kg. of egg-yolks are mixed, at a temperature of about 15° Celsius, with 500 kg. of acetic ether in a shaking-apparatus; the acetic ether extract is filtered off, placed into a distilling-apparatus and there subjected to distillation.

The distilled and cooled acetic ether is repeatedly used for making extracts from the yolk until the acetic ether flows off almost colorlessly. Now the residue of the yolk is, by drying it in a vacuum, freed of every trace of the extracting-medium, and there is obtained a pulverous preparation containing from 35-40% of lecithin, but no cholesterin. If pure lecithin is to be obtained from the residue of the cold extraction by acetic ether, the extraction is not interrupted but continued with the distilled acetic ether, but at a temperature of from 40-70° until it is fully exhausted. In a cold state the lecithin is crystallized out in a pure form without any trouble. The duration of the whole operation depends solely on the kind of the extracting-apparatus used. The yield from 100 kg. of yolk is about 9-10 kg. of pure lecithin. For obtaining the yolk-oil the acetic-ether extract produced from the yolk in a cold state, is after the separation of cholesterin as above, further freed from the acetic ether in a vacuum in a warm room. Out of 100 kg. of yolk about 25 kg. of yolk-oil is won. Cholesterin separates from the yolk-oil at a temperature of about 15° and can by the process already known be obtained directly in a pure form by centrifuging and recrystallizing. The yield from 100 kg. of yolk is from 1.3 to 1.75 kg. of cholesterin. With other suitable esters the *modus operandi*, as well as the yield, is about the same. Of other esters those to be considered here more particularly are acetic methylic esters, butylic methylic esters and mixtures of these esters with acetone. The yolk-oil, for instance, is used as a substitute for cod-liver oil in the manufacture of skin-creams and the soap-manufacture.

What we claim as our invention and desire to secure by United States Letters Patent is:—

1. The herein described process of obtaining mixed lecith-albumin and lecithin, from animal and vegetable substances containing lecithin, which consists in separating the fat, associated cholesterin, coloring matters and aromatic substances therefrom, by extracting the same in the cold in a volatile ester of a saturated fatty acid and collecting the solid residue, substantially as set forth.

2. The herein described process of obtaining mixed lecith-albumin and lecithin, from animal and vegetable substances containing lecithin, which consists in separating the fat, associated cholesterin, coloring matters and aromatic substances therefrom, by extracting the same in cold acetic ether and collecting the solid residue, substantially as set forth.

3. The herein described process of obtaining lecithin, in pure form from animal and vegetable substances containing lecithin which consists in separating from the lecith-albumin and lecithin the fat, associated cholesterin coloring matters and aromatic substances by extracting the same in a cold volatile ester of a saturated fatty acid then collecting the solid residue of mixed lecith-albumin and lecithin, extracting the lecithin therefrom in hot volatile ester of a saturated fatty acid and separating the pure lecithin by cooling the solution, substantially as set forth.

4. The herein described process of obtaining lecithin, in pure form from animal and vegetable substances containing lecithin which consists in separating from the lecith-albumin and lecithin the fat, associated cholesterin coloring matters and aromatic substances by extracting the same in cold acetic ether then collecting the solid residue of mixed lecith-albumin and lecithin, extracting the lecithin therefrom in hot acetic ether and separating the pure lecithin by cooling the solution, substantially as set forth.

5. The herein described process of obtaining lecithin, in pure form from egg-yolk which consists in separating from the lecith-albumin and lecithin the fat, associated cholesterin coloring matters and aromatic substances by extracting the same in a cold volatile ester of a saturated fatty acid then collecting the residue of mixed lecith-albumin and lecithin, extracting the lecithin therefrom in hot volatile ester of a saturated fatty acid and separating the pure lecithin by cooling the solution, substantially as set forth.

In testimony whereof we have signed our names to this specification in the presence of two subscribing witnesses.

JOSEF HABERMANN.
RICHARD EHRENFELD.

Witnesses:
KARL KELLER,
ENGELBERT MONDELICHT.